United States Patent
Shigyo (10) Patent No.: US 8,688,322 B2
(45) Date of Patent: Apr. 1, 2014

(54) AIR CONDITIONER FOR VEHICLE

(75) Inventor: Masakatsu Shigyo, Handa (JP)

(73) Assignee: Denso Corporation, Kariya (JP)

(*) Notice: Subject to any disclaimer, the term of this patent is extended or adjusted under 35 U.S.C. 154(b) by 128 days.

(21) Appl. No.: 13/430,006

(22) Filed: Mar. 26, 2012

(65) Prior Publication Data

US 2012/0253573 A1    Oct. 4, 2012

(30) Foreign Application Priority Data

Mar. 28, 2011    (JP) ................... 2011-069538

(51) Int. Cl.
*B60H 1/00* (2006.01)
*B60H 1/02* (2006.01)

(52) U.S. Cl.
USPC ............................................ 701/36; 454/159

(58) Field of Classification Search
CPC ........... B60H 1/00271; B60H 1/00385; B60H 2001/003; B60R 16/00
USPC ....... 701/36, 123; 700/276; 165/42; 454/139, 454/159, 160, 161; 123/142.5 R
See application file for complete search history.

(56) References Cited

U.S. PATENT DOCUMENTS

| | | | |
|---|---|---|---|
| 6,935,129 B2 | 8/2005 | Sasaki et al. | |
| 2001/0010261 A1* | 8/2001 | Oomura et al. | 165/42 |
| 2003/0182955 A1 | 10/2003 | Hirao et al. | |
| 2005/0178523 A1* | 8/2005 | Itoh et al. | 165/42 |
| 2006/0122737 A1* | 6/2006 | Tani et al. | 700/286 |
| 2011/0048671 A1* | 3/2011 | Nishikawa et al. | 165/42 |
| 2011/0232890 A9* | 9/2011 | Gering et al. | 165/202 |
| 2012/0247716 A1* | 10/2012 | Galtz et al. | 165/42 |
| 2012/0312520 A1* | 12/2012 | Hoke et al. | 165/203 |

FOREIGN PATENT DOCUMENTS

| | | |
|---|---|---|
| JP | 2002-120546 | 4/2002 |
| JP | 2004-136699 | 5/2004 |
| JP | 2004-322914 | 11/2004 |
| JP | 2007-127316 | 5/2007 |

OTHER PUBLICATIONS

Office Action issued Jan. 15, 2013 in corresponding Japanese Application No. 2011-069538 with English translation.

* cited by examiner

*Primary Examiner* — Fadey Jabr
*Assistant Examiner* — Thomas Ingram
(74) *Attorney, Agent, or Firm* — Harness, Dickey & Pierce, PLC (57) ABSTRACT

An air conditioner for a vehicle in which an operational efficiency of an in-vehicle equipment is controlled, includes a first heating portion which heats air to be blown into a vehicle compartment by using heat medium, a second heating portion which heats the blown air by using heating energy outputted from the in-vehicle equipment, a determination portion which determines a target heat amount ratio that is a target value of a heating amount ratio of a second heat amount used in the second heating portion to a first heat amount used in the first heating portion, and a heating adjustment portion which adjusts at least one of the first and second heat amounts such that the heat amount ratio approaches the target heat amount ratio. The target heat amount ratio is increased in accordance with an increase of the operational efficiency.

8 Claims, 6 Drawing Sheets

AIR CONDITIONER FOR VEHICLE

CROSS REFERENCE TO RELATED APPLICATION

This application is based on and incorporates herein by reference Japanese Patent Application No. 2011-069538 filed on Mar. 28, 2011.

TECHNICAL FIELD

The present disclosure relates to an air conditioner for a vehicle, which can perform heating operation of a vehicle compartment by utilizing energy and waste heat from an equipment attached to the vehicle.

BACKGROUND

Conventionally, Patent Document 1 (JP2001-001749A corresponding to US 2003/0182955A1) describes regarding an air conditioner for a vehicle that includes an interior heat exchanger and a heater core. The interior heat exchanger is used as a condenser which condenses refrigerant in a heat pump cycle, and the heater core is a heating heat exchanger which heats air by using engine coolant (hot water) as a heat source. The engine coolant is used for cooling an engine which is an equipment attached to the vehicle. The interior heat exchanger and the heater core heat air to be blown into a vehicle compartment of the vehicle, and accordingly, the air conditioner performs a heating operation of the vehicle compartment.

In the air conditioner described in Patent Document 1, the interior heat exchanger is arranged upstream of the heater core in a flow direction of air so that air having been heated in the interior heat exchanger is re-heated in the heater core. A temperature of air to be blown into the vehicle compartment is adjusted by using a flow adjustment valve which adjusts a flow amount of the engine coolant supplied to the heater core.

Hence, in order to perform the heating operation of the vehicle compartment effectively, a temperature of the engine coolant is required to be higher than a temperature of blown air having been heated in the interior heat exchanger of the heat pump cycle. However, if the air conditioner described in Patent Document 1 is used for a hybrid vehicle, waste heat of the engine is too little to be utilized for heating the vehicle compartment via the engine coolant. Therefore, effective heating of the vehicle compartment may be difficult.

Patent Document 2 (JP2006-166639A corresponding to US 2006/0122737A1) describes regarding a power controller for a vehicle, which distributes power from multiple power sources such as, an engine-driven power generator and a battery, to various electric loads attached to the vehicle. The power controller described in Patent Document 2 determines power generating capacities of power generators of the vehicle based on, for example, a total power consumption of the variety of electric loads, such that an operational efficiency of an engine of the vehicle becomes high.

SUMMARY

The present applicant previously proposed an air conditioner for a vehicle, described in Patent Document 3 (JP2011-073668A corresponding to US 2011/0048671A1), in which an interior heat exchanger of a heat pump cycle is arranged downstream of a heater core in an air flow direction. The vehicle air conditioner controls an operation of the heat pump cycle to adjust a temperature of air to a predetermined temperature, thereby heating a vehicle compartment appropriately.

Moreover, the vehicle air conditioner described in Patent Document 3 adjusts a flow amount of engine coolant flowing through the heater core such that a temperature of the engine coolant, which flows out of the heater core into the engine, is made to be higher than a predetermined temperature. Thus, a temperature of the engine is prevented from reducing. As a result, when heating operation of the vehicle compartment is performed in a stop state of the engine, frequency of restart of the engine for its warm-up is reduced. Therefore, fuel efficiency of the vehicle in the stop state of the engine is improved.

Figure 6:
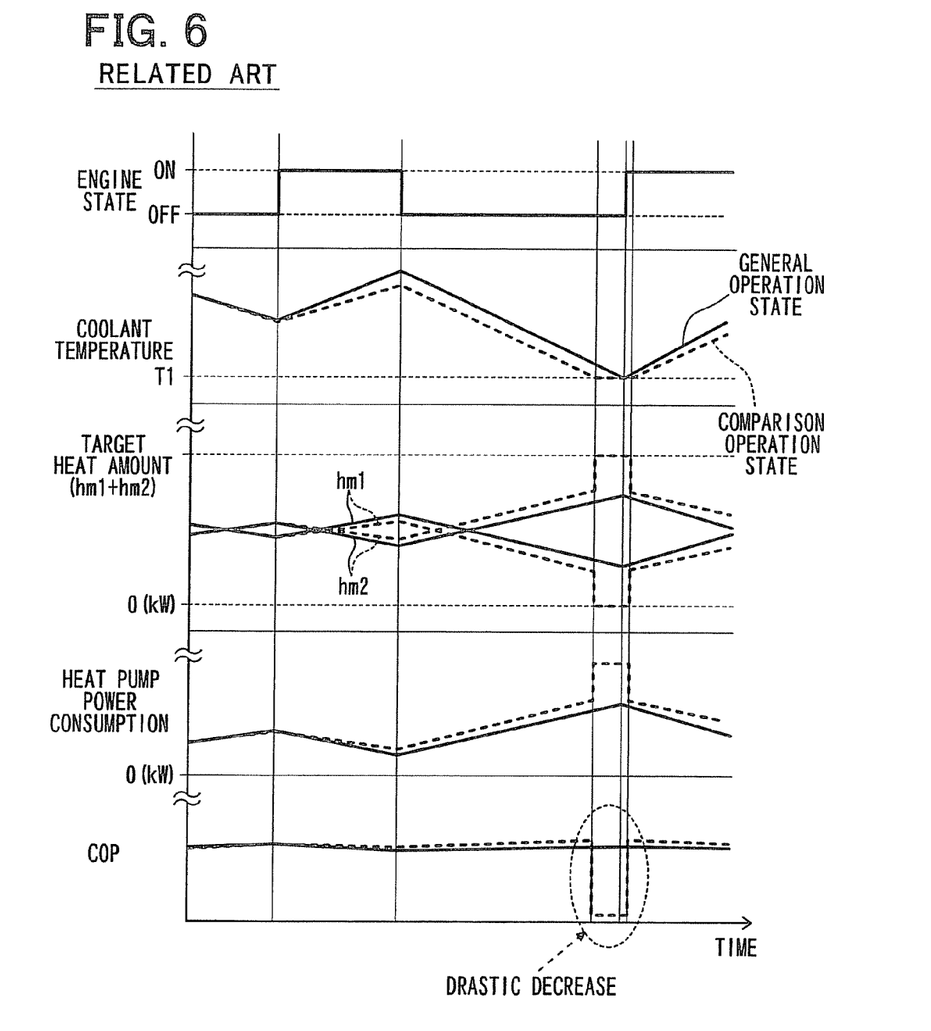
FIG. 6 is a time chart showing an operation state of the engine, a temperature of coolant flowing out of the engine, a first heat amount hm1 used for heating air in a heater core, a second heat amount hm2 used for heating air in a heat pump cycle, a power consumption of the heat pump cycle, and a coefficient of performance (COP) of the heat pump cycle, according to a comparison example.

It can be considered that the fuel efficiency of the vehicle may be further improved, if an operational efficiency of the engine according to Patent Document 3 is improved by using the power controller of Patent Document 2 as in a comparison example shown in FIG. 6. However, according to a study of the present applicant, it may be difficult to improve the fuel efficiency in the comparison example.

Figure 5:
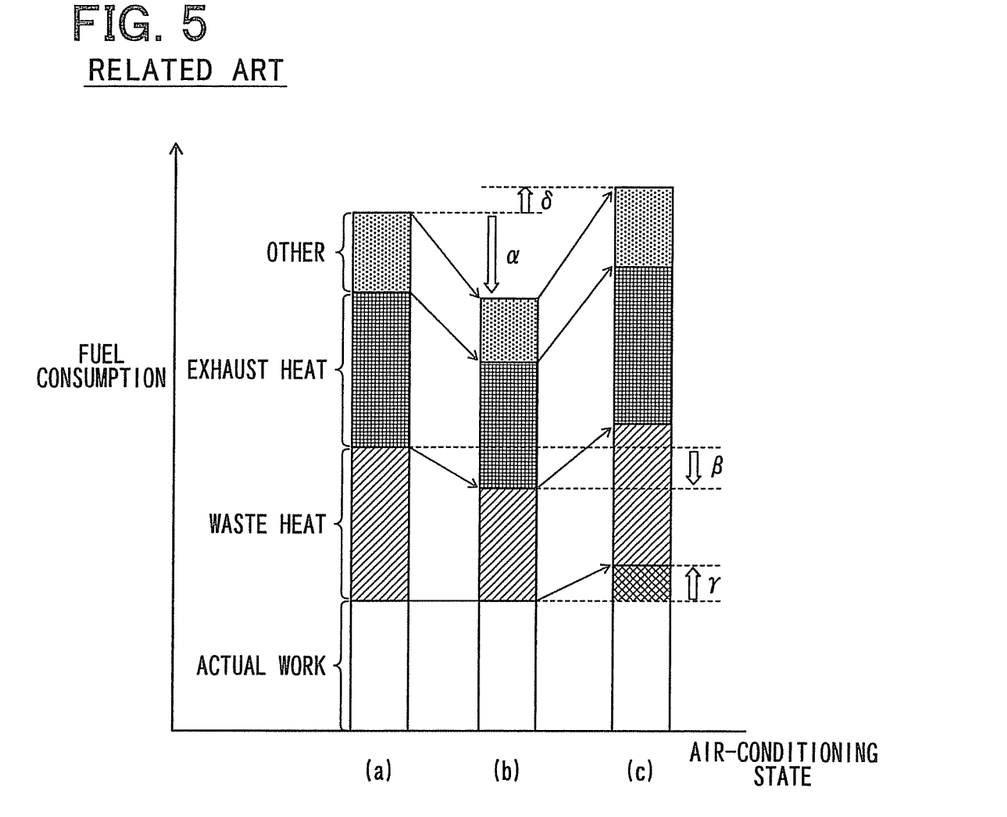
FIG. 5 is a diagram showing an energy breakdown of a total fuel consumption of an engine.

FIG. 5 shows an energy breakdown of total fuel consumption (kW) of an engine in various air-conditioning states. The bar graph (a) in FIG. 5 shows when the engine is operated in a predetermined efficiency in a non-heating operation, and the bar graph (b) shows when an operational efficiency of the engine is improved from the state shown by the bar graph (a). And, the bar graph (c) shows when fuel consumption is increased from the state shown by the bar graph (b) in order to perform an appropriate heating operation.

As shown by an arrow $\alpha$ in FIG. 5, when the operational efficiency of the engine is improved from the state of the bar graph (a) to the state of the bar graph (b), the fuel consumption can be reduced without changing actual work of the engine. At the same time, waste heat of the engine absorbed by engine coolant decreases as shown by an arrow $\beta$ in FIG. 5. Thus, a temperature of the engine coolant flowing into a heater core decreases.

Subsequently, in order to perform the heating operation of the vehicle compartment appropriately, a heating capacity of a heat pump cycle is required to increase, and thus an electric power supplied to a compressor of the heat pump cycle is required to be improved. Hence, the actual work of the engine has to be increased as shown by an arrow $\gamma$ in FIG. 5. As a result, in the heating operation shown in the bar graph (c) of FIG. 5, the total fuel consumption of the engine is increased as shown by an arrow $\delta$ in FIG. 5 as compared with the non-heating operation, and the fuel efficiency thereby decreases.

Furthermore, similar to the air conditioner of Patent Document 3, when the temperature of the engine coolant flowing into the heater core is low, an amount of the engine coolant flowing through the heater core is reduced in order to prevent a temperature of the engine from excessively decreasing. In such a case, the heat pump cycle is required to compensate a whole heat amount necessary for heating the vehicle compartment. Therefore, the heat pump cycle is required to be operated in a higher loaded state than in a normal state, and a coefficient of performance (COP) of the heat pump cycle reduces drastically as shown in FIG. 6.

FIG. 6 is a time chart of the comparison example showing an operation state of the engine, a temperature of the engine coolant flowing out of the engine, a first heat amount hm1 used for heating air in the heater core, a second heat amount hm2 used for heating air in the heat pump cycle, a power consumption of the heat pump cycle, and the COP of the heat pump cycle.

The heat amount hm1 can be represented as a heat amount of the engine coolant used for heating air in the heater core, and the heat amount hm2 can be also represented as a heat amount generated from the heat pump cycle for heating air.

In FIG. 6, bold solid lines show a general operation state in which the engine is operated in a predetermined operational efficiency, and bold dashed lines show a comparison operation state in which the operational efficiency of the engine is improved as compared with the general operation state. Additionally, a coolant temperature T1 shown in FIG. 6 is a standard warm-up temperature below which the engine is required to be activated for warming itself.

As shown in FIG. 6, when the operational efficiency of the engine is improved as in the comparison operation state, the temperature of the engine coolant in a driving state of the engine is difficult to be increased to a highest value in the general operation state. Hence, when the engine stops and the flow amount of the engine coolant flowing through the heater core is reduced in the comparison operation state, the first heat amount hm1 becomes almost zero, and the second heat amount hm2 is required to more increase. However, if the second heat amount hm2 is more increased, the COP of the heat pump cycle is reduced substantially.

Moreover, because the heat pump cycle consumes electrical power in the COP-decreased state, the actual work of the engine is required to be more increased for generating electricity used for compensating the consumed electrical power at the next time of activation of the engine. Therefore, the fuel efficiency further decreases.

The present disclosure addresses at least one of the above disadvantages. According to an aspect of the present disclosure, an air conditioner is adapted for a vehicle having an in-vehicle equipment which outputs heating energy for heating air to be blown into a vehicle compartment of the vehicle, in which a temperature of the in-vehicle equipment is adjusted to be within a predetermined standard range, and an operational efficiency ($\eta e$) of the in-vehicle equipment is controlled such that a fuel consumption of the in-vehicle equipment approaches a smallest amount when the in-vehicle equipment is operated. The air conditioner includes a first heating portion, a second heating portion, a determination portion, and a heating adjustment portion. The first heating portion is arranged in a circulation circuit through which heat medium heated by waste heat of the in-vehicle equipment circulates, and the first heating portion heats air to be blown into the vehicle compartment by using the heat medium as a heat source. The second heating portion is configured to heat the blown air by using the heating energy outputted from the in-vehicle equipment. The determination portion is configured to determine a target heat amount ratio that is a target value of a heat amount ratio (hm2/hm1). The heat amount ratio (hm2/hm1) is a ratio of a second heat amount (hm2) used for heating the blown air in the second heating portion to a first heat amount (hm1) used for heating the blown air in the first heating portion. The heating adjustment portion is configured to adjust at least one of the first heat amount (hm1) and the second heat amount (hm2) such that the heat amount ratio (hm2/hm1) approaches the target heat amount ratio. The determination portion causes the target heat amount ratio to be increased in accordance with an increase of the operational efficiency ($\eta e$).

BRIEF DESCRIPTION OF THE DRAWINGS

The disclosure, together with additional objectives, features and advantages thereof, will be best understood from the following description, the appended claims and the accompanying drawings in which:

DETAILED DESCRIPTION

Embodiments

An exemplar embodiment of the present disclosure will be described hereinafter referring to FIGS. 1 to 4. In the present exemplar embodiment, an air conditioner 1 for a vehicle is typically used for a hybrid vehicle (HV) in which a driving power for running is obtained from an internal combustion engine 10 and an electrical motor 80.

Figure 1:
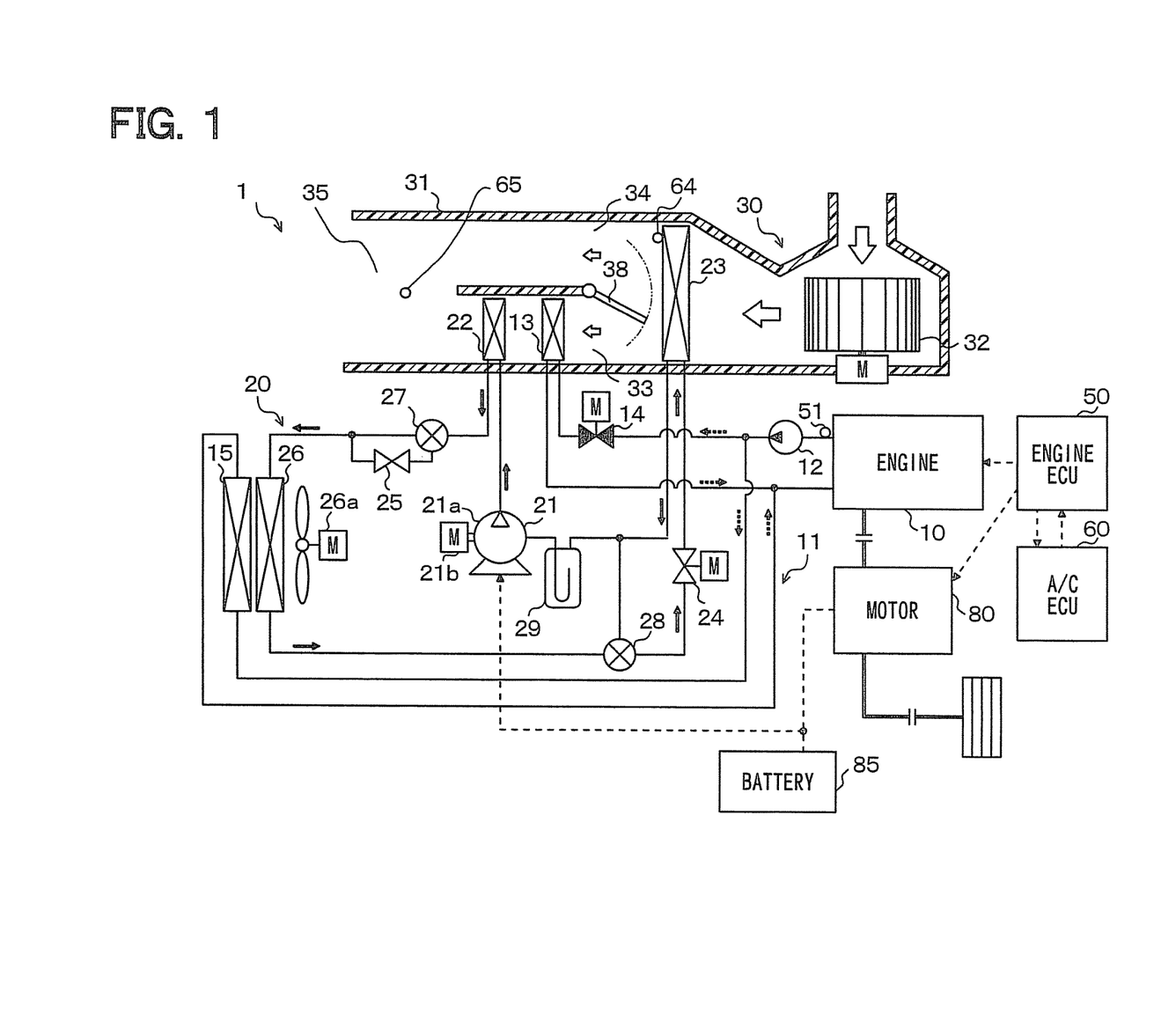
FIG. 1 is a schematic diagram showing an air conditioner for a vehicle, according to an exemplar embodiment of the present disclosure.

The hybrid vehicle in the present exemplar embodiment can generally switch its running states by actuating or stopping the engine 10 depending on a running load of the vehicle. For example, in one (hybrid vehicle state) of the running states, driving power is obtained from both of the engine 10 and the electrical motor 80. In another state (electric vehicle state), driving force is obtained only from the electrical motor 80 by stopping the engine 10. Accordingly, the hybrid vehicle can improve its fuel efficiency as compared to a vehicle in which driving power is obtained only from an engine.

The engine 10 is a gasoline engine controlled by a control signal outputted from an engine controller 50 (engine ECU) described later. The electrical motor 80 is an alternating-current motor which outputs driving power by utilizing an electrical power supplied from a battery 85. Moreover, the electrical motor 80 can be used also as a power generator which generates power by utilizing driving power outputted from the engine 10.

The electrical power generated by the electrical motor 80 is accumulated in the battery 85. The battery 85 includes a lithium-ion secondary battery which can be discharged and charged repeatedly. The electrical power accumulated in the battery 85 is supplied to the electrical motor 80, various components of a heat pump cycle 20 of the vehicle air conditioner 1 which cools or heats air to be blown into a vehicle compartment of the vehicle, and other components of the vehicle.

In other words, a mechanical energy outputted from the engine 10 through consumption of fuel is used not only for vehicle running, but also for driving the electrical motor 80 which functions as the power generator. Thus, the mechanical energy can be transformed into air-conditioning energy (electrical energy) for heating or cooling air to be blown into the vehicle compartment, or into energy (electrical energy) for driving the electrical vehicle components.

Hereinafter, a part of the energy consumed in the air-conditioning is utilized for heating air in heating of the vehicle compartment as heating energy. Thus, the engine 10 of the present exemplar embodiment outputs the heating energy utilized for heating air to be blown into the vehicle compartment, and the engine 10 is an example of an in-vehicle equipment which output the heating energy.

The engine 10 produces heat during its operation, and thus the vehicle air conditioner 1 of the present exemplar embodiment utilizes waste heat of the engine 10 as a heat source to heat air. Specifically, the engine 10 is connected to a coolant circuit 11 used as an example of a circulation circuit through which engine coolant circulates as an example of heat medium, and the engine coolant heated by absorbing the waste heat of the engine 10 is used to heat air.

The coolant circuit 11 includes a coolant pump 12, a heater core 13, a flow adjustment valve 14 and a radiator 15. The coolant pump 12 is an electrical pump, in which its rotational speed (discharge capacity of the engine coolant) is controlled by a control signal outputted from the engine controller 50. Dashed arrows along the coolant circuit 11 in FIG. 1 show a flow direction of the engine coolant.

The heater core 13 is a heating heat exchanger arranged in an air passage of an interior air-conditioning unit 30 of the vehicle air conditioner 1, through which air to be blown into the vehicle compartment flows. The heater core 13 heats air passing therethrough by heat-exchange between the engine coolant and air in a heating mode, a dehumidifying-heating mode or the like. Hence, the heater core 13 is an example of a first heating portion, which heats air blown into the vehicle compartment by utilizing the engine coolant as a heat source. The utilized engine coolant has heated by absorbing the waste heat of the engine 10.

The flow adjustment valve 14 is used as a heating capacity changing portion that changes a heating capacity of the heater core 13 by changing the flow amount of the engine coolant flowing through the heater core 13. For example, the flow adjustment valve 14 includes a valve body with a variable open degree, and an electrical actuator for controlling the open degree of the valve body. The operation of the flow adjustment valve 14 is controlled by a control signal outputted from an air conditioning controller 60 (A/C ECU).

Furthermore, the flow adjustment valve 14 is capable changing a heat amount ratio hm2/hm1 by changing the heating capacity of the heater core 13. The heat amount ratio hm2/hm1 is a ratio of a second heat amount hm2 used for heating air in the heat pump cycle 20 to a first heat amount hm1 used for heating air in the heater core 13. Therefore, the flow adjustment valve 14 of the present exemplar embodiment is used also as an example of a heating adjustment portion.

The radiator 15 is a heat exchanger which cools engine coolant by exchanging heat between the engine coolant and outside air (e.g., air outside the vehicle compartment). Thus, the radiator 15 can be used for radiating the waste heat of the engine 10, which has been absorbed into the engine coolant, to the atmosphere while the engine coolant passing through the radiator 15. The heater core 13 and the radiator 15 are arranged in parallel with respect to the flow of the engine coolant in the coolant circuit 11 of the present exemplar embodiment.

Here, the temperature of the engine 10 is preferable to be kept within a predetermined standard range (e.g., from 40° C. to 100° C.). Excessive increase in the temperature of the engine 10 causes overheat of the engine 10, and conversely, excessive decrease in the temperature of the engine 10 causes increase of viscosity of lubrication oil and causes decrease in a temperature of exhaust gas. The increase of viscosity of lubrication oil leads to increase of friction loss, and the decrease in the temperature of exhaust gas leads to malfunction of an exhaust-gas purification catalyst.

Thus, in the present exemplar embodiment, the coolant circuit 11 includes a bypass passage (not shown) which bypasses the radiator 15, and a connection portion between the coolant circuit 11 and the bypass passage has a thermostat (not shown). The thermostat is a mechanical valve which displaces a valve body thereof by using a thermo wax (thermostatic member) to adjust flow amounts of engine coolant flowing through the radiator 15 and flowing through the bypass passage. Here, the thermo wax changes its volume depending on a temperature of the engine coolant.

More specifically, with increase of the temperature of the engine coolant flowing around the thermostat, a position of the valve body of the thermostat is changed to increase a flow amount of engine coolant flowing to the radiator 15 and to decrease a flow amount of engine coolant flowing to the bypass passage. On the other hand, in accordance with decrease of the temperature of the engine coolant flowing around the thermostat, the position of the valve body of the thermostat is changed to decrease the flow amount of engine coolant flowing to the radiator 15 and to increase the flow amount of engine coolant flowing to the bypass passage.

Accordingly, when the engine 10 is operated, the temperature of the engine coolant, i.e., the temperature of the engine 10 is adjusted to be within the predetermined standard range (e.g., from 40° C. to 100° C.).

As described above, in the hybrid vehicle, the engine 10 may be stopped in accordance with a running load of the vehicle, and the temperature of the engine 10 may decrease. Hence, when a coolant temperature Tw flowing out of the engine 10 is lower than a predetermined value, the engine controller 50 performs a warm-up control of the engine 10 regardless of the vehicle running state.

Next, a configuration of the vehicle air conditioner 1 of the present exemplar embodiment will be described. The vehicle air conditioner 1 includes the heat pump cycle 20 (vapor-compressing refrigerant cycle device) that is configured to select an air conditioning mode among (i) a cooling mode for cooling the vehicle compartment, (ii) a heating mode for heating the vehicle compartment, and (iii) a dehumidifying-heating mode for dehumidifying and heating the vehicle compartment. In FIG. 1, bold solid arrows along the heat pump cycle 20 indicate a flow direction of refrigerant in the cooling mode.

The heat pump cycle 20 includes an electrical compressor 21, an interior condenser 22, an interior evaporator 23, an electrical expansion valve 24, a fixed throttle 25, an exterior heat exchanger 26 in which refrigerant exchanges heat with outside air, and multiple (e.g., two) electrical switching valves 27, 28 used as an example of a refrigerant circuit switching portion which switches the refrigerant circuit. The interior condenser 22 and the interior evaporator 23 are adopted as interior heat exchangers in which air to be blown into the vehicle compartment exchanges heat with refrigerant. The expansion valve 24 and the fixed throttle 25 are used as examples of a decompression portion which decompresses and expands refrigerant.

As described above, the heat pump cycle 20 heats or cools air to be blown into the vehicle compartment, and various electrical components of the heat pump cycle 20 are actuated by utilizing the heating energy (electrical energy) transmitted from the engine 10. Therefore, the heat pump cycle 20 in the heating mode is used as an example of a second heating portion for heating air to be blown into the vehicle compartment.

The compressor 21 is disposed in an engine compartment of the vehicle to draw and compress refrigerant, and then to discharge the compressed refrigerant. The compressor 21 is an electrical compressor in which a fixed-displacement compression mechanism 21a with a fixed discharge capacity is driven by an electrical motor 21b. As the fixed-displacement compression mechanism 21a, various compression mechanisms such as, a scroll-type compression mechanism or a vane-type compression mechanism, may be used.

Figure 2:
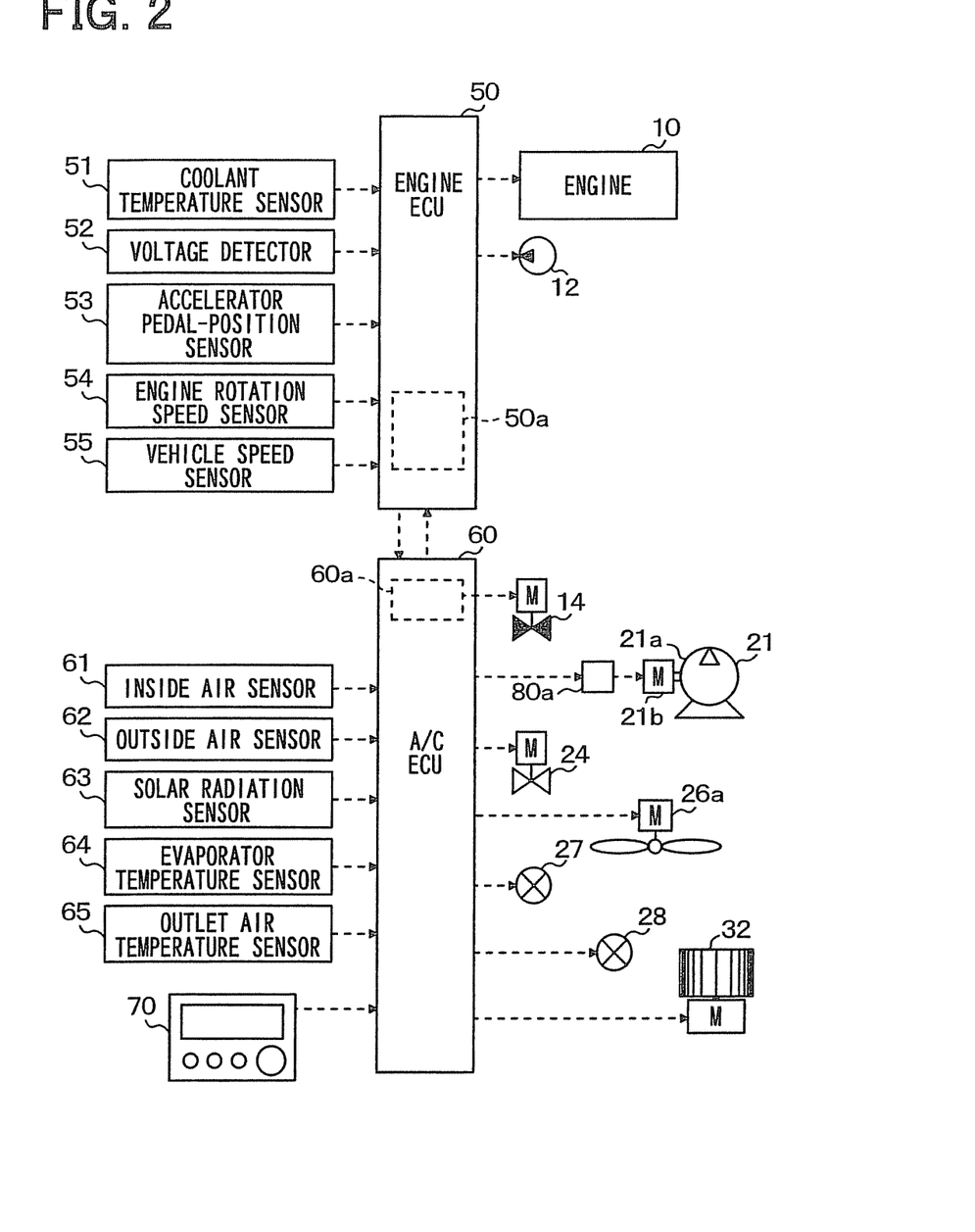
FIG. 2 is a block diagram showing an electric control portion of the air conditioner for a vehicle, according to the exemplar embodiment.

The electrical motor 21b is an alternate motor in which its operation (rotation speed) is controlled by an alternate voltage outputted from an inverter 80a shown in FIG. 2. The inverter 80a outputs an alternate voltage having a frequency in accordance with a control signal outputted from the air conditioning controller 60. The refrigerant discharge capacity of the compressor 21 is changed and controlled by the control of the rotation speed of the electrical motor 21b.

A refrigerant discharge side of the compressor 21 is connected to a refrigerant inlet of the interior condenser 22. The interior condenser 22 is arranged downstream of the heater core 13 in the flow direction of air in the air passage of the interior air-conditioning unit 30. The interior condenser 22 is a heating heat exchanger which heats air by heat-exchange between refrigerant flowing through the interior condenser 22 and air having passed through the interior evaporator 23 and the heater core 13.

A refrigerant outlet of the interior condenser 22 is connected to a first electrical switching valve 27. The first electrical switching valve 27 is used as the example of the refrigerant circuit switching portion in which its operation is controlled by a control signal outputted from the air conditioning controller 60. More specifically, the first electrical switching valve 27 switches between a refrigerant circuit, through which a refrigerant outlet of the interior condenser 22 is coupled to a refrigerant inlet of the exterior heat exchanger 26, and a refrigerant circuit, through which the refrigerant outlet of the interior condenser 22 is coupled to an inlet of the fixed throttle 25.

The fixed throttle 25 is a heating decompression portion which decompresses and expands refrigerant flowing out of the first electrical valve 27 in the heating mode and in the dehumidifying-heating mode. For example, a capillary tube or an orifice may be adopted as the fixed throttle 25. Moreover, instead of the fixed throttle 25, a variable throttle or electrical expansion valve may be used, for example. An outlet of the fixed throttle 25 is connected to the refrigerant inlet of the exterior heat exchanger 26.

The exterior heat exchanger 26 is disposed in the engine compartment, such that refrigerant flowing in the exterior heat exchanger 26 is heat-exchanged with outside air (i.e., air outside the vehicle compartment) blown by a blower fan 26a. The blower fan 26a is an electrical fan, in which its rotation speed (air blowing amount) is controlled by a control voltage outputted from the air conditioning controller 60.

The blower fan 26a of the present exemplar embodiment blows outside air not only to the exterior heat exchanger 26 but also to the radiator 15 arranged in the coolant circuit 11. More specifically, the outside air blown by the blower fan 26a passes through the exterior heat exchanger 26 and the radiator 15, in this order.

A refrigerant outlet of the exterior heat exchanger 26 is connected to a second electrical switching valve 28 used as an example of the refrigerant circuit switching portion. A basic structure of the second electrical switching valve 28 is similar to that of the first electrical switching valve 27. More specifically, the second electrical switching valve 28 switches between a refrigerant circuit, through which the refrigerant outlet of the exterior heat exchanger 26 is coupled to an inlet of the electrical expansion valve 24, and a refrigerant circuit, through which the refrigerant outlet of the exterior heat exchanger 26 is coupled to an inlet of an accumulator 29.

The electrical expansion valve 24 is a cooling decompression portion which decompresses and expands refrigerant flowing out of the second electrical switching valve 28 in the cooling mode and in the dehumidifying-heating mode. The electrical expansion valve 24 is an electrical variable throttle mechanism in which a throttled passage cross section is adjusted by a control signal outputted from the air conditioning controller 60. Moreover, when the throttled passage cross section is largest, refrigerant is not decompressed and not expanded while passing through the electrical expansion valve 24. Thus, in this case, the electrical expansion valve 24 of the present exemplar embodiment is used just as a refrigerant passage without throttling.

An outlet of the electrical expansion valve 24 is connected to a refrigerant inlet of the interior evaporator 23. The interior evaporator 23 is arranged upstream of the interior condenser 22 and the heater core 13 in the air flow direction in the air passage of the interior air-conditioning unit 30. The interior evaporator 23 is a cooling heat exchanger, in which refrigerant flowing therein exchanges heat with air and is evaporated by absorbing heat from the air so as to cool the air in the cooling mode and in the dehumidifying-heating mode.

A refrigerant outlet of the interior evaporator 23 is connected to the inlet of the accumulator 29. The accumulator 29 is a low-pressure side gas-liquid separator, in which refrigerant flowing therein is separated into gas refrigerant and liquid refrigerant, and surplus refrigerant is accumulated therein. A gas-refrigerant outlet of the accumulator 29 is connected to a refrigerant suction port of the compressor 21.

Next, the interior air-conditioning unit 30 will be described. The interior air-conditioning unit 30 is located inside of an instrument panel positioned at a front end part of the vehicle compartment. The interior air-conditioning unit 30 includes a casing 31 forming an outer shell and defining the air passage. In the casing 31, a blower 32, the interior evaporator 23, the heater core 13, the interior condenser 22 and the like are disposed.

The casing 31 defines the air passage through which air flows into the vehicle compartment. The casing 31 is made of a resin (e.g., polypropylene) having a suitable elasticity and being superior in the strength. An inside/outside air switching device (not shown) is located in the casing 31 at the most upstream side, to selectively introduce inside air (i.e., air inside the vehicle compartment) or/and outside air (i.e., air outside the vehicle compartment) into the casing 31.

The inside/outside air switching device can be switched to any one air suction mode among an inside air mode, an outside air mode, and an inside/outside air mixing mode. In the inside air mode, the inside/outside air switching device only introduces inside air into the casing 31. In the outside air mode, the inside/outside air switching device only introduces outside air into the casing 31. In the inside/outside air mode, the inside/outside air switching device introduces both inside air and outside air into the casing 31. The operation of the inside/outside air switching device is controlled by a control signal outputted from the air conditioning controller 60.

The blower 32 is disposed in the casing 31 at a downstream air side of the inside/outside air switching device, to blow air drawn via the inside/outside air switching device toward the vehicle compartment. The blower 32 is an electrical blower having a centrifugal multi-blade fan (sirocco fan) driven by an electrical motor, in which its rotation speed (air blowing amount) is controlled by a control voltage outputted from the air conditioning controller 60.

The above-described interior evaporator 23 is arranged downstream of the blower 32 in the air flow direction. Moreover, the air passage of the interior air-conditioning unit 30 includes a first air passage 33 and a second air passage 34 at a downstream side of the interior evaporator 23 in the air flow direction, through which air having passed through the interior evaporator 23 flows. Additionally, the air passage of the interior air-conditioning unit 30 includes a mixing space 35 at a downstream side of the first and second air passages 33, 34, such that air having passed through the first and second air passages 33, 34 is mixed in the mixing space 35.

In the first air passage 33, the heater core 13 and the interior condenser 22 are arranged in this order in the air flow direction. The second air passage 34 guides cool air having passed through the interior evaporator 23 to the mixing space 35 so that the cool air bypasses the heater core 13 and the interior condenser 22.

Hence, a temperature of air mixed at the mixing space 35 changes depending on a flow amount ratio of air passing through the first air passage 33 to air passing through the second air passage 34. Thus, in the present exemplar embodiment, in order to change the flow amount ratio of airs flowing into the first and second air passages 33, 34 continuously, an air mix door 38 is arranged downstream of the interior evaporator 23 and upstream of the first and second air passages 33, 34 in the air flow direction.

The air mix door 38 is used as an example of a temperature adjusting portion which adjusts the temperature of air in the mixing space 35, i.e., a temperature of conditioned air to be blown into the vehicle compartment. The air mix door 38 is driven by an electrical actuator in which its operation is controlled by a control signal outputted from the air conditioning controller 60.

The most downstream end of the casing 31 in the air flow direction has multiple air outlets (not shown) through which conditioned air is blown from the mixing space 35 into the vehicle compartment. The vehicle compartment is a space to be air-conditioned. The air outlets are, for example, a face air outlet through which conditioned air is blown toward an upper side of a passenger in the vehicle compartment, a foot air outlet through which conditioned air is blown toward a foot area of the passenger in the vehicle compartment, and a defroster air outlet through which conditioned air blown toward an inner surface of a windshield of the vehicle.

A face door, a foot door, and a defroster door (all of the doors are not shown) are provided at upstream sides of the face air outlet, the foot air outlet, and the defroster air outlet in the air flow direction respectively, thereby adjusting open areas of their corresponding air outlets.

The face door, the foot door, and the defroster door are adopted as examples of an outlet mode switching portion which switches an air outlet mode. These three doors are coupled to an electrical actuator through a not-shown link mechanism, thereby being operatively linked with each other. The electrical actuator is also controlled by a control signal outputted from the air conditioning controller 60.

The air outlet mode includes a face mode, a bi-level mode, a foot mode and a foot/defroster mode. In the face mode, the face air outlet is fully opened so that conditioned air is blown toward the upper side of the passenger in the vehicle compartment from the face air outlet. In the bi-level mode, both the face air outlet and the foot air outlet are opened so that conditioned air is blown toward the upper side and the foot area of the passenger in the vehicle compartment. In the foot mode, the foot air outlet is fully opened and the defroster air outlet is opened by a small open degree so that conditioned air is mainly blown from the foot air outlet. In the foot/defroster mode, the foot air outlet and the defroster air outlet are opened by approximately same open degree so that conditioned air is blown from both the foot air outlet and the defroster air outlet.

Furthermore, as the air outlet mode, a defroster mode can be set, in which the defroster air outlet is fully opened so that conditioned air is blown toward the inner surface of the windshield of the vehicle from the defroster air outlet, when the passenger manually controls switches of an operation panel 70 described later.

Next, an electrical control portion of the present exemplar embodiment will be described referring to FIG. 2. The engine controller 50 and the air conditioning controller 60 include a generally known microcomputer, which includes CPU, ROM and RAM, and their peripheral circuits. The two controllers 50, 60 perform various calculations and processes based on a control program stored on the ROM, and control operations of various devices connected to output sides of the two controllers 50, 60.

The output side of the engine controller 50 is connected to various components (engine control devices) or the like of the engine 10 in addition to the above-described coolant pump 12. For example, a drive circuit of a fuel injection valve (injector), which supplies fuel to the engine 10, is connected to the output side of the engine controller 50.

An input side of the engine controller 50 is connected to a sensor group for controlling the engine 10. The sensor group includes a coolant temperature sensor 51 which detects the coolant temperature Tw of the engine coolant immediately after flowing out of the engine 10, a voltage detector 52 which detects an electrical voltage VB of the battery 85, an accelerator pedal-position sensor 53 which detects an accelerator pedal position Acc, an engine rotation speed sensor 54 which detects a rotation speed Ne of the engine 10, and a vehicle speed sensor 55 which detects a vehicle speed Vv.

The coolant temperature sensor 51 of the present exemplar embodiment detects the coolant temperature Tw of the engine coolant immediately after flowing out of the engine 10, and the coolant temperature Tw has a correlation with the temperature of the engine 10. Thus, in the engine controller 50 of the present embodiment, the detection value (coolant temperature Tw) from the coolant temperature sensor 51 is used as the temperature of the engine 10 for the control of the above-described coolant pump 12 and the like.

The engine controller 50 of the present exemplar embodiment further includes a memory circuit 50a as an example of a storage portion, in which a correlation between the coolant temperature Tw and a target heat amount ratio TP is stored. The target heat amount ratio TP will be described later.

The output side of the air conditioning controller 60 is connected to various air-conditioning control devices that includes the flow adjustment valve 14, the inverter 80a for the electrical motor 21b of the compressor 21, the electrical expansion valve 24, the blower fan 26a, the first and second electrical switching valve 27, 28, the blower 32, the inside/outside air switching device, and the electrical actuators for driving the air mix door 38 and the doors of the air outlets.

An input side of the air conditioning controller 60 is connected to an air conditioning sensor group. The air conditioning sensor group includes an inside air sensor 61 which detects a temperature Tr of the vehicle compartment, an outside air sensor 62 which detects a temperature Tam of outside air, a solar radiation sensor 63 which detects a solar radiation Ts entering to the vehicle compartment, an evaporator temperature sensor 64 (evaporator temperature detection portion) which detects a temperature Te of air blown out of the interior evaporator 23, and an outlet air temperature sensor 65 which detects a temperature Tout of air flowing into the vehicle compartment. The temperature Te of air flowing out of the interior evaporator 23 corresponds to an evaporation temperature of refrigerant flowing in the interior evaporator 23.

The input side of the air conditioning controller 60 is further connected to the operation panel 70 arranged near the instrument panel at the front end part of the vehicle compartment, and control signals from various air-conditioning control switches of the operation panel 70 are input to the air conditioning controller 60. For example, the air-conditioning control switches are an automatic operation switch of the vehicle air conditioner 1, a temperature setting switch configured to set a setting temperature Tset of the vehicle compartment, an air-conditioning-mode selecting switch, an air outlet mode selecting switch and an air amount setting switch of the blower 32.

The engine controller 50 and the air conditioning controller 60 can be provided integrally in a control portion which controls the above-described various air-conditioning control devices. For example, in the present exemplar embodiment, the air conditioning controller 60 includes a heat-amount-ratio control portion 60a (a hardware and a software) which controls the operation of the flow adjustment valve 14. Here, the flow adjustment valve 14 is adopted as the heating adjustment portion.

The engine controller 50 and the air conditioning controller 60 are electrically connected to each other. Therefore, based on detection signals or control signals inputted to one of the controllers 50, 60, the other one of the two controllers 50, 60 can control the various devices connected to the output side of the other one of the controllers 50, 60. The engine controller 50 and the air conditioning controller 60 may be integrated into a single control unit. Alternatively, the air conditioning controller 60 may include a part of the control process of the engine controller 50. For example, the air conditioning controller 60 may include a control operation of step S3 shown in FIG. 3.

Figure 3:
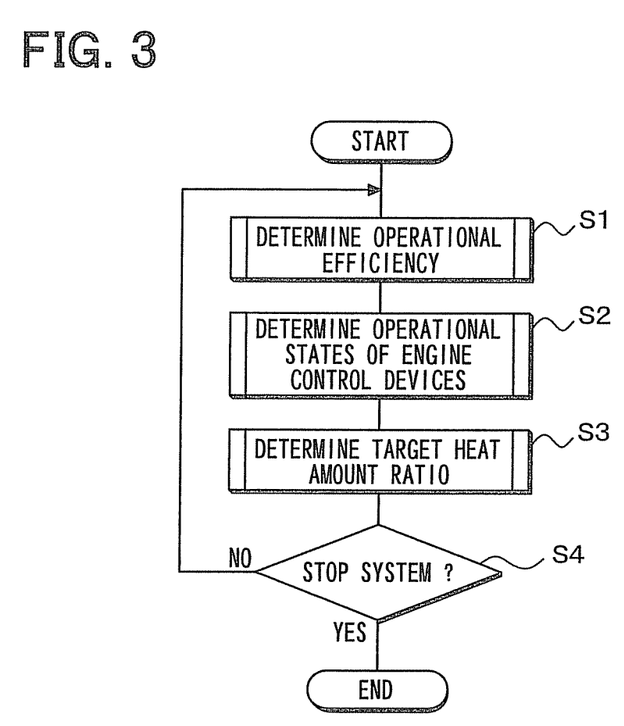
FIG. 3 is a flowchart showing an operational control of an engine of the vehicle performed by the electric control portion of the air conditioner according to the exemplar embodiment.

Next, an operation in the above-described configuration of the present exemplar embodiment will be described. First, a basic operation of the engine 10 will be described. When a vehicle start switch is turned on and a vehicle system is activated, the engine controller 50 actuates the coolant pump 12 and controls an operational state of the engine 10 as shown in FIG. 3, such that the coolant pump 12 has a predetermined coolant discharge capacity.

When the engine controller 50 actuates the coolant pump 12, engine coolant flows through the engine 10 and absorbs waste heat of the engine 10 to cool the engine 10. The absorbed waste heat is radiated to the atmosphere by the radiator 15. When a temperature of the engine coolant is relatively high, the engine coolant flows mainly toward the radiator 15 by an action of the thermostat. When the temperature of the engine coolant is relatively low, the engine coolant flows mainly into the bypass passage by the action of the thermostat.

When most of the engine coolant flows through the bypass passage, the engine coolant radiates little heat at the radiator 15. As a result, the temperature of the engine 10, i.e., the coolant temperature Tw can be kept within the standard temperature range (e.g., from 40° C. to 100° C.) during its operation.

When the engine 10 is not required to be operated as driving power for vehicle running, the engine 10 is stopped. In this case, the coolant temperature Tw cannot be increased.

On the other hand, when the coolant temperature Tw is lower than or equal to a predetermined standard warm-up temperature T1 (e.g., 30° C.) in a case where a vehicle system is turned on by a passenger, the engine controller 50 of the present exemplar embodiment performs the warm-up control, in which the engine 10 is activated and the coolant temperature Tw is increased regardless of the running state of the vehicle. Accordingly, the temperature of the engine 10 is prevented from decreasing excessively.

Next, a control of the operational state of the engine 10 by the engine controller 50 will be described referring to FIG. 3. At step S1, the engine controller 50 determines the operational state of the engine 10 to activate or stop the engine 10 depending on the running load of the vehicle. Specifically, the engine controller 50 calculates the running load of the vehicle based on detection signals from the above-described sensor group 51 to 55 so that the engine controller 50 activates or stops the engine 10 depending on the calculated running load.

Additionally, the engine controller 50 determines a target efficiency Tη of the engine 10 such that a fuel consumption used for outputting an actual work of the engine 10 approaches the smallest value during the operation of the engine 10. The actual work is a sum of, for example, an energy for vehicle running, an energy for driving vehicle components other than the engine 10, and an energy (heating energy in the heating mode) for air-conditioning of the vehicle compartment, other than energy of the waste heat of the engine 10.

At next step S2, the engine controller 50 determines operational states of the engine control devices based on the vehicle running load and an air conditioning load by using a control map stored in a memory circuit of the engine controller 50 such that an actual operational efficiency ηe of the engine 10 approaches the target efficiency Tη. The operational states of the engine control devices are, for example, a fuel amount injected from the fuel injection valve (injector) and a time of ignition of fuel-air mixture gas in a combustion chamber of the engine 10.

At step S3, the engine controller 50 determines the target heat amount ratio TP, which is a target value of a heat amount ratio hm2/hm1, based on the operational efficiency ηe (e.g., target efficiency Tη) of the engine 10. The heat amount ratio hm2/hm1 is a ratio of a heat amount hm2 used for heating air in the heat pump cycle 20 to a heat amount hm1 used for heating air in the heater core 13. In the present exemplar embodiment, the control operation of step S3 is adopted as an example of a determination portion.

Specifically, the target heat amount ratio TP is determined as follows. First, a first fuel cost f1 is defined as Ful1/hw, which indicates a fuel consumption of the engine 10 per unit heat amount in the heater core 13. Here, Ful1 [kW] is a total fuel consumption of the engine 10, and hw is an amount of the waste heat transferred from the engine 10 to engine coolant. Additionally, a full output energy that the engine 10 can output is defined as egyl [kW], the operational efficiency of the engine 10 is defined as ηe (e.g., target efficiency Tη), and a heat amount used for heating air in the heater core 13 is defined as the first heat amount hm1 [kW]. The total fuel consumption Ful1 of the engine 10 is obtained by dividing the full output energy egyl of the engine 10 by the operational efficiency ηe of the engine 10. Thus, the first fuel cost f1 can be calculated by using a following formula F1.

$$f1 = Ful1/hw = (egyl/\eta e)/hw \tag{F1}$$

Secondly, a second fuel cost f2, which indicates a fuel consumption of the engine 10 per unit heat amount of the heat pump cycle 20, can be calculated by using a following formula F2.

$$f2 = Ful2/hm2 \quad (F2)$$

Here, Ful2 [kW] is a fuel consumption of the engine 10 used for outputting the heating energy, i.e., for outputting a driving force for generating electrical power supplied to the heat pump cycle 20, and hm2 [kW] is a second heat amount used for heating air in the heat pump cycle 20.

Finally, the target heat amount ratio TP is determined in such a manner that a sum of two products, which are a product of the first fuel cost f1 and the first heat amount hm1 and a product of the second fuel cost f2 and the second heat amount hm2, approaches a minimal value.

Here, the Ful1 (Ful1=egyl/$\eta$e) in the above-described formula F1 of the first fuel cost f1 is a necessary fuel amount for generating the actual work of the engine 10. The actual work includes, at least, the energy for vehicle running, the energy for driving vehicle components other than the engine 10, and the energy (heating energy in the heating mode) for air-conditioning of the vehicle compartment.

If the operational efficiency $\eta$e is increased without changing the actual work, the waste heat of the engine 10 decreases, and the first fuel cost f1 thereby becomes high. Therefore, at step S3, the target heat amount ratio TP is determined such that the second heat amount hm2 in the heat pump cycle 20 is increased and the first heat amount hm1 in the heater core 13 is decreased in accordance with increase of the operational efficiency $\eta$e.

In other words, at step S3, in accordance with increase of the operational efficiency $\eta$e of the engine 10, the target heat amount ratio TP is determined to be increased and determined. Furthermore, in the present exemplar embodiment, a degree of elevation of the target heat amount ratio TP is increased in accordance with decrease of the coolant temperature Tw.

The first fuel cost f1 and the second fuel cost f2 which are calculated at step S3 are stored on the memory circuit 50a together with the coolant temperature Tw. Hence, if the memory circuit 50a has a first fuel cost f1 and a second fuel cost f2 which correspond to a present coolant temperature Tw detected in a present period of a control cycle of the operational control of the engine controller 50, the target heat amount ratio TP is determined based on the stored first and second fuel costs f1 and f2.

At nest step S4, the engine controller 50 outputs control signals to the various engine control devices connected to the output side of the engine controller 50, such that the engine 10 is operated in an operational state (operational efficiency) determined at step S1. Additionally, a target heat amount ratio TP determined at step S3 is output to the air conditioning controller 60. The control operations at steps S1 to S3 are performed repeatedly until the vehicle system is determined to be stopped by a passenger at step S4.

Next, an operation of the vehicle air conditioner 1 will be described. When the automatic operation switch of the operation panel 70 is turned ON while the vehicle start switch is turned ON, the air conditioning controller 60 receives detection signals from the above-described air conditioning sensor group, control signals from the operation panel 70, and signals from the engine controller 50. Then, the air conditioning controller 60 controls the various air-conditioning control devices connected to the output side of the air conditioning controller 60.

Specifically, the air conditioning controller 60 determines the air conditioning mode based on a control signal from the air-conditioning-mode selecting switch of the operation panel 70. Depending on the determined air conditioning mode, the air conditioning controller 60 determines control states of the electrical expansion valve 24 and the first and second electrical switching valves 27, 28 used as the examples of the refrigerant circuit switching portion.

For example, when the cooling mode is selected as the air conditioning mode, the first electrical switching valve 27 is switched so that the refrigerant outlet of the interior condenser 22 is coupled to the refrigerant inlet of the exterior heat exchanger 26 via the switching valve 27. Moreover, the second electrical switching valve 28 is switched so that the refrigerant outlet of the exterior heat exchanger 26 is coupled to the inlet of the electrical expansion valve 24 via the switching valve 28, and the electrical expansion valve 24 is operated to be in a throttled state in which refrigerant is decompressed and expanded.

When the heating mode is selected as the air conditioning mode, the first electrical switching valve 27 is switched so that the refrigerant outlet of the interior condenser 22 is coupled to the inlet of the fixed throttle 25 via the switching valve 27. Additionally, the second electrical switching valve 28 is switched so that the refrigerant outlet of the exterior heat exchanger 26 is coupled to the inlet of an accumulator 29 via the switching valve 28.

When the dehumidifying-heating mode is selected as the air conditioning mode, the first electrical switching valve 27 is switched so that the refrigerant outlet of the interior condenser 22 is coupled to the inlet of the fixed throttle 25 via the switching valve 27. Furthermore, the second electrical switching valve 28 is switched so that the refrigerant outlet of the exterior heat exchanger 26 is coupled to the inlet of the electrical expansion valve 24 via the switching valve 28, and the electrical expansion valve 24 is operated to be in a fully open state in which refrigerant is not decompressed and not expanded.

The air conditioning controller 60 determines a temperature (target outlet air temperature TAO) of air blown out of the air outlets, a temperature (target coolant evaporation temperature TEO) of air flowing at the interior evaporator 23 and the like based on the detection signals and the control signals. Then, the air conditioning controller 60 determines operational states of the various air-conditioning control devices, which are connected to the output side of the air conditioning controller 60, based on the determined target outlet air temperature TAO, the determined target coolant evaporation temperature TEO and the detection signals from the sensor group.

For example, an air blowing amount of the blower 32, i.e., a blower-motor voltage applied to an electrical motor of the blower 32 is determined based on the target outlet air temperature TAO by using a control map stored in a memory circuit of the air conditioning controller 60.

Specifically, in the control map of the present embodiment, when the target outlet air temperature TAO is determined to be within an extremely-low temperature range (maximum cooling) or be within an extremely-high temperature range (maximum heating), the blower-motor voltage is set to be largest value so that the air blowing amount of the blower 32 is controlled to be largest. When the target outlet air temperature TAO is determined so as to shift gradually from the extremely-low or extremely-high temperature range to a middle temperature range, the blower-motor voltage is decreased based on the shift of the target outlet air temperature TAO in order to decrease the air blowing amount of the blower 32.

A refrigerant discharge capacity of the compressor 21, i.e., a frequency of alternating current supplied to the electrical motor 21b of the compressor 21 is determined by using a feedback control method or the like such that the coolant evaporation temperature Te detected by the evaporator temperature sensor 64 approaches the target coolant evaporation temperature TEO.

An open degree of the air mix door 38 in the cooling mode is determined by using the feedback control or the like such that the outlet air temperature Tout detected by the outlet air temperature sensor 65 approaches the target outlet air temperature TAO. The open degree of the air mix door 38 in the heating mode or the dehumidifying-heating mode is determined to be in a fully heating position in which the first air passage 33 is fully open and the second air passage 34 is fully closed.

A valve open degree of the flow adjustment valve 14 in the cooling mode is determined to be a predetermined standard valve open degree. In the heating mode or the dehumidifying-heating mode, the valve open degree of the flow adjustment valve 14 is adjusted such that the above-described heat amount ratio hm2/hm1 approaches the target heat amount ratio TP determined in the above-described control operation of step S3 (determination portion).

The first heat amount hm1 used for heating air in the heater core 13 has a correlation with the coolant temperature Tw, and the second heat amount hm2 used for heating air in the heat pump cycle 20 has a correlation with a temperature (pressure) of high-pressure refrigerant discharged from the compressor 21.

Thus, the air conditioning controller 60 of the present exemplar embodiment determines the valve open degree of the flow adjustment valve 14 based on the coolant temperature Tw, a flow rate of air passing through the heater core 13, and a temperature of air flowing into the heater core 13 or the coolant evaporation temperature Te, by using a control map stored on the memory circuit of the air conditioning controller 60, such that the heat amount hm1 used in the heater core 13 satisfies the target heat amount ratio TP.

In order to provide the above-described determined operational states of the various air-conditioning control devices, the air conditioning controller 60 outputs control voltages and control signals to the various air-conditioning control devices. Then, the air conditioning controller 60 performs the above-described control routine repeatedly in a predetermined control cycle until the vehicle air conditioner 1 is stopped by a stop operation of the control panel 70. In the control routine, the air conditioning controller 60 receives the detection signals and the control signals→calculates the target outlet air temperature TAO→determines the operational states of the various air-conditioning control devices→outputs the control voltages and the control signals.

In the cooling mode, a vapor-compression refrigerant cycle is configured such that refrigerant is circulated in this order of the compressor 21→the interior condenser 22→the first electrical switching valve 27→the exterior heat exchanger 26→the second electrical switching valve 28→the electrical expansion valve 24→the interior evaporator 23→the accumulator 29→the compressor 21. That is, the interior condenser 22 and the exterior heat exchanger 26 are used as condensers (refrigerant radiators), and the interior evaporator 23 is used as a refrigerant evaporator.

Thus, in the cooling mode, air blown by the blower 32 is cooled by the interior evaporator 23, and the air cooled at the interior evaporator 23 flows into the first air passage 33 and the second air passage 34 in accordance with the open degree of the air mix door 38. The cool air flowing into the first air passage 33 is heated while passing through the heater core 13, and is mixed in the mixing space 35 with the cool air having passed through the second air passage 34.

The cool air conditioned in temperature in the mixing space 35 is blown out through the air outlets into the vehicle compartment. Accordingly, the cooling operation of the vehicle compartment can be performed.

The cooling mode is an operational mode in which cool air is blown mainly into the vehicle compartment. Hence, the open degree of the air mix door 38 is controlled such that a flow amount of cool air in the first air passage 33 is smaller than a flow amount of cool air in the second air passage 34. Therefore, in the cooling mode, the valve open degree of the flow adjustment valve 14 is set to be a predetermined standard valve open degree by the air conditioning controller 60 of the present exemplar embodiment.

In the heating mode, a vapor-compression refrigerant cycle is configured such that refrigerant is circulated in this order of the compressor 21→the interior condenser 22→the first electrical switching valve 27→the fixed throttle 25→the exterior heat exchanger 26→the second electrical switching valve 28→the accumulator 29→the compressor 21. That is, the interior condenser 22 is used as a condenser (refrigerant radiator), and the exterior heat exchanger 26 is used as a refrigerant evaporator.

Thus, in the heating mode, air blown by the blower 32 flows into the first air passage 33 without being cooled at the interior evaporator 23. Then, the air flowing into the first air passage 33 passes through the heater core 13 and the interior condenser 22 in this order, and is heated to the target outlet air temperature TAO to be warm air. The warm air conditioned in temperature in the mixing space 35 is blown through the air outlets into the vehicle compartment. Accordingly, the heating operation of the vehicle compartment can be performed.

In the dehumidifying-heating mode, a vapor-compression refrigerant cycle is configured such that refrigerant is circulated in this order of the compressor 21→the interior condenser 22→the first electrical switching valve 27→the fixed throttle 25→the exterior heat exchanger 26→the second electrical switching valve 28 (→the electrical expansion valve 24)→the interior evaporator 23→the accumulator 29→the compressor 21. That is, the interior condenser 22 is used as a condenser (refrigerant radiator), and the exterior heat exchanger 26 and the interior evaporator 23 are used as refrigerant evaporators.

Thus, in the dehumidifying-heating mode, air blown by the blower 32 is cooled and dehumidified at the interior evaporator 23, and flows into the first air passage 33. The cool air flowing into the first air passage 33 passes through the heater core 13 and the interior condenser 22 in this order, and is heated to the target outlet air temperature TAO to be warm air. The warm air conditioned in temperature in the mixing space 35 is blown through the air outlets into the vehicle compartment. Accordingly, the dehumidifying-heating operation of the vehicle compartment can be performed.

In the present exemplar embodiment, air passes through the heater core 13 and the interior condenser 22 in this order in the first air passage 33, so that the blown air heated at the heater core 13 is reheated at the interior condenser 22. Moreover, a heating capacity of the interior condenser 22 is controlled so that a temperature of the air blown into the vehicle compartment approaches the target outlet air temperature TAO.

Therefore, even if the waste heat of the engine 10 for heating the engine coolant is insufficient for increasing a temperature of the vehicle compartment to a desired temperature (i.e., target outlet air temperature TAO), a temperature of the air blown into the vehicle compartment is increased adequately by using the heating capacity of the interior condenser 22. Accordingly, the vehicle compartment can be heated or/and dehumidified appropriately.

The engine 10 of the present exemplar embodiment is controlled by the above-described control operation of step S1 in FIG. 3. Specifically, the engine 10 is controlled such that the actual operational efficiency $\eta e$ of the engine 10 approaches the target efficiency $T\eta$. The target efficiency $T\eta$ of the engine 10 is determined, such that a fuel consumption used for outputting a required actual work approaches the smallest value when the engine 10 is operated.

If the engine 10 is controlled only by the control operation of step S1, the waste heat of the engine 10 may decrease and the coolant temperature Tw tends to be reduced even in an operating state of the engine 10. In this case, the heating capacity of the heat pump cycle 20 is likely to be increased, and the vehicle air conditioner 1 may be more frequently operated in a high-loaded operation state in which a coefficient of performance (COP) tends to be lower than a normal operation state. As a result, a fuel consumption of the engine 10 for generating the heating energy may be increased, and a fuel efficiency of the vehicle may decrease.

To that end, in the vehicle air conditioner 1 of the present exemplar embodiment, the determination portion (e.g., the control operation of step S3) determines the target heat amount ratio TP such that the target heat amount ratio TP is increased in accordance with an increase of the operational efficiency $\eta e$ of the engine 10. This means that the heat amount ratio hm2/hm1 is increased in accordance with the increase of the operational efficiency $\eta e$ of the engine 10. That is, the second heat amount hm2 used in the heat pump cycle 20 is increased while the first heat amount hm1 used in the heater core 13 is decreased, as the operational efficiency $\eta e$ of the engine 10 increases.

Therefore, even if the operational efficiency $\eta e$ of the in-vehicle equipment such as the engine 10 is improved, decrease of the fuel efficiency of the vehicle can be limited and the vehicle compartment can be heated appropriately. This will be described with reference to FIG. 4 which corresponds to FIG. 6.

Figure 4:
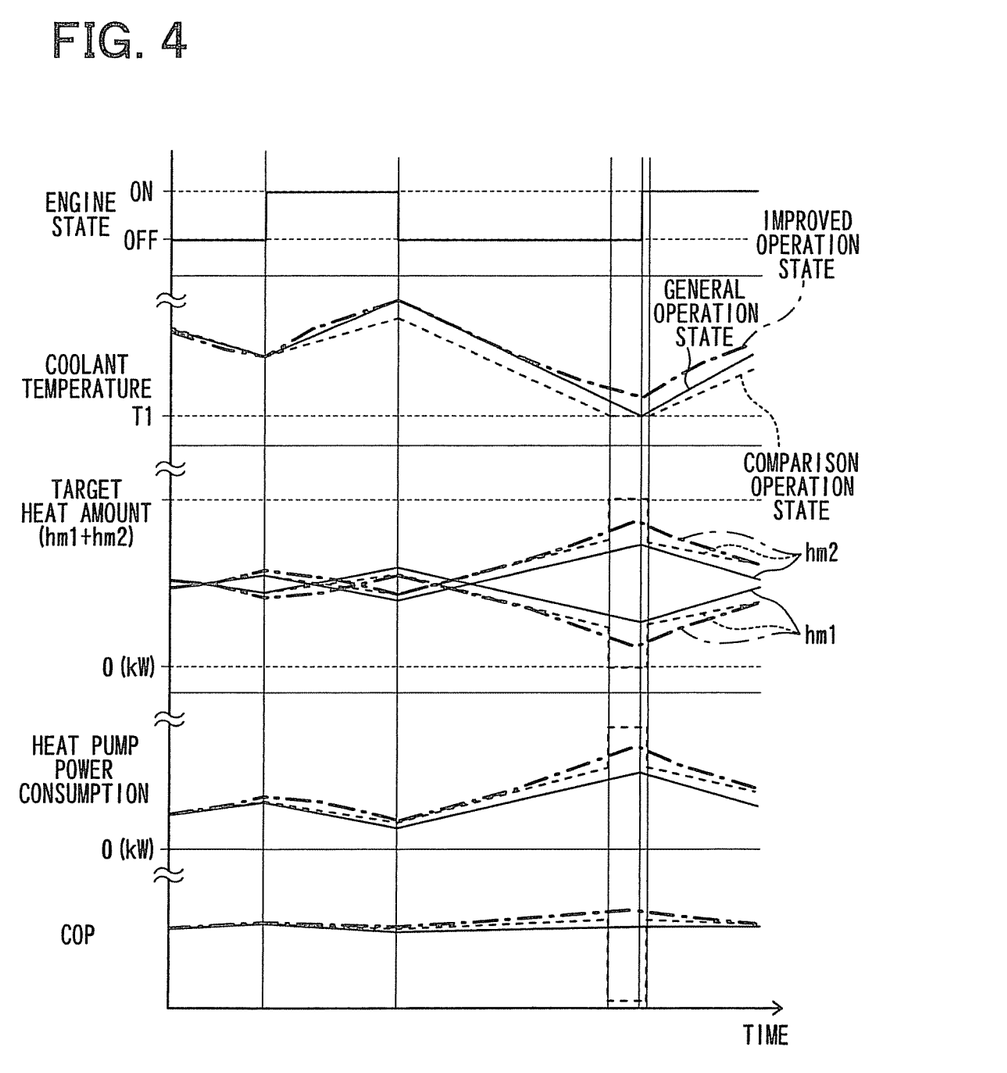
FIG. 4 is a time chart showing an operation state of the engine, a temperature of coolant flowing out of the engine, a first heat amount hm1 used for heating air in a heater core, a second heat amount hm2 used for heating air in a heat pump cycle, a power consumption of the heat pump cycle, and a coefficient of performance (COP) of the heat pump cycle, according to the exemplar embodiment.

In FIG. 4, thin lines indicate a general operation state in which the engine 10 of the present exemplar embodiment is operated in a predetermined operational efficiency, thin dashed lines indicate a comparison operation state in which the operational efficiency $\eta e$ of the engine 10 is improved without the control of the target heat amount ratio TP, and alternate long and short dash bold lines indicate an improved operation state of the present exemplar embodiment in which the operational efficiency $\eta e$ of the engine 10 of the vehicle air conditioner 1 is improved with the control of the target heat amount ratio TP.

As shown in FIG. 4, in the vehicle air conditioner 1 with the improved operation state of the present exemplar embodiment, a decrement of the coolant temperature Tw can be limited while air is heated in the heater core 13, as compared to the comparison operation state in which the target heat amount ratio TP is not controlled, i.e., only a flow amount of the engine coolant flowing through the heater core 13 is adjusted in accordance with the coolant temperature Tw of the engine coolant flowing into the heater core 13. Consequently, in the improved operation state, the temperature of the engine 10, i.e., the coolant temperature Tw can be made higher than the predetermined warm-up temperature T1, while the frequency of the warm-up operation of the engine 10 can be reduced. Accordingly, decrease of the fuel efficiency of the vehicle can be limited, and the coolant temperature Tw after restarting the engine 10 can be increased immediately.

Because the decrement of the coolant temperature Tw of the engine coolant flowing out of the heater core 13 can be limited, the first heat amount hm1 used in the heater core 13 is prevented from becoming zero. Thus, it can effectively reduce an operation time in which the heat pump cycle 20 is operated with the second heat amount hm2 to compensate a total necessary heat amount for heating or dehumidifying-heating of the vehicle compartment. Hence, a frequency of rapid elevation of the heating capacity of the heat pump cycle 20 can be reduced. Therefore, the heat pump cycle 20 can be prevented from being operated frequently in the high-loaded operation state in which the COP tends to be low.

As a result, the fuel consumption of the engine 10 for outputting the heating energy can be reduced. Even if the operational efficiency $\eta e$ of the engine 10 is improved, the decrease of the fuel efficiency of the vehicle can be limited substantially and the vehicle compartment can be heated appropriately.

In the vehicle air conditioner 1 of the present exemplar embodiment, because the elevation degree of the heat amount ratio hm2/hm1 is increased in accordance with decrease of the coolant temperature Tw, the first heat amount hm1 can be reduced with the decrease of the coolant temperature Tw.

Hence, the decrement of the coolant temperature Tw of the engine coolant flowing out of the heater core 13 can be limited further effectively, and the warm-up operation, in which the temperature of the engine 10 is made to be within the predetermined standard range, is further prevented from being performed frequently. Therefore, the decrease of the fuel efficiency of the vehicle can be limited effectively.

Additionally, in the vehicle air conditioner 1 of the present exemplar embodiment, the first fuel cost f1 defined by the above-described formula F1 is adopted as an index indicating a fuel consumption of the engine 10 per unit heat amount in the heater core 13, and the second fuel cost f2 defined by the above-described formula F2 is adopted as an index indicating a fuel consumption of the engine 10, which is used for outputting the heating energy, per unit heat amount in the heat pump cycle 20. Thus, when the sum of two products, which are the product of the first fuel cost f1 and the first heat amount hm1 and the product of the second fuel cost f2 and the second heat amount hm2 is a minimal value, the fuel consumption for performing the heating operation of the vehicle compartment is also a minimal value. Hence, the fuel efficiency can be increased specifically. More specifically, when the operational efficiency $\eta e$ is increased, a ratio (hw/Ful1) of the waste heat hw to the total fuel consumption Ful1 is decreased. Thus, in the present exemplar embodiment, when the first fuel cost f1 is increased in accordance with the increase of the operational efficiency $\eta e$, the heat amount hm2 used in the heat pump cycle 20 is increased. On the other hand, when the first fuel cost f1 is decreased in accordance with decrease of the operational efficiency $\eta e$, the heat amount hm2 used in the heat pump cycle 20 is decreased. Therefore, the target heat amount ratio TP can be increased with increase of the operational efficiency $\eta e$ easily and specifically.

Furthermore, the vehicle air conditioner 1 of the present exemplar embodiment includes the memory circuit 50a as the example of the storage portion for storing the correlation between the coolant temperature Tw and a target heat amount ratio TP. Therefore, a correspondence relation between the temperature Tw of the engine coolant flowing out of the engine 10 and the first fuel cost f1 can be stored, and then controllability of the whole vehicle air conditioner 1 can be improved.

Although the present disclosure has been fully described in connection with the preferred exemplar embodiment thereof with reference to FIGS. 1 to 4, it is to be noted that various changes and modifications will become apparent to those skilled in the art. Thus, the present disclosure is not limited to the above-described exemplar embodiment, and can be modified as follows without departing from the scope of the present disclosure.

(i) In the above-described embodiment, the heat pump cycle 20 is adopted as the example of the second heating portion for heating air to blown into the vehicle compartment, but the second heating portion is not limited to the heat pump cycle 20. For example, an electrical heater (e.g., positive temperature coefficient heater) or the like may be adopted as the second heater. The electrical heater heats air by utilizing an electrical energy transformed from a mechanical energy outputted from an in-vehicle equipment such as the engine 10.

Moreover, the second heating portion may heat air by directly utilizing the mechanical energy outputted from the in-vehicle equipment. For example, an engine-driven heat pump cycle or a viscous heater which heats air by utilizing expansion energy caused from agitation of oil or the like may be used as the second heating portion.

(ii) In the above-described embodiment, the flow adjustment valve 14 is adopted as the example of the heating adjustment portion, which adjusts the heat amount ratio hm2/hm1 by controlling the heating capacity of the heater core 13 used as the example of the first heating portion. However, the heating adjustment portion is not limited to the flow adjustment valve 14, and the coolant pump 12 may be used as the heating adjustment portion, for example. In this case, the heating adjustment portion may adjust the heat amount ratio hm2/hm1 by controlling the engine coolant discharge capacity of the coolant pump 12.

Furthermore, the blower 32 may be used as an example of the heating adjustment portion, and may adjust the heat amount ratio hm2/hm1 by controlling a flow amount of air which exchanges heat with engine coolant at the heater core 13.

(iii) In the above-described embodiment, the vehicle air conditioner of the present disclosure is used for a hybrid vehicle in which driving force is obtained from the engine 10 and the electrical motor 80. However, the vehicle air conditioner of the present disclosure is not limited to this.

For example, the vehicle air conditioner of the present disclosure may be used for a fuel cell vehicle which runs by operating an electrical motor with an electrical power outputted from a fuel cell. In this case, the fuel cell, which outputs an electrical energy as the heating energy by using hydrogen fuel, may be used as an example of the in-vehicle equipment, and coolant of the fuel cell may be used as a heat source of the first heating portion.

The vehicle air conditioner of the present disclosure may be used for an electrical vehicle without an engine and a fuel cell but with a battery and an electrical motor used for vehicle running. In this case, the electrical motor for vehicle running may be used as an example of the in-vehicle equipment, and coolant for the electrical motor or coolant for an inverter may be used as an example of the heat source of the first heating portion. Furthermore, the vehicle air conditioner of the present disclosure may be used for a normal vehicle including an engine and a power generator but not having an electrical motor used for vehicle running.

(iv) In the above-described embodiment, the coolant temperature Tw of the engine coolant immediately after flowing out of the engine 10 is adopted as the temperature of the engine 10 used as the example of the in-vehicle equipment. However, a physical amount which can be adopted as the temperature of the engine 10 is not limited to the coolant temperature Tw. For example, a detection value from a detection portion, which detects a temperature of outer periphery of the engine 10, may be used as the temperature of the engine 10.

(v) In the above-described embodiment, the heater core 13 used as the example of the first heating portion is arranged in the air flow direction upstream of the interior condenser 22 of the heat pump cycle 20 used as the example of the second heating portion. However, the arrangement of the heater core 13 and the interior condenser 22 is not limited to this. For example, the heater core 13 and the interior condenser 22 may be arranged in parallel with respect to the air flow direction.

Additional advantages and modifications will readily occur to those skilled in the art. The disclosure in its broader terms is therefore not limited to the specific details, representative apparatus, and illustrative examples shown and described.

What is claimed is:

1. An air conditioner for a vehicle having an in-vehicle equipment which outputs heating energy for heating air to be blown into a vehicle compartment of the vehicle, in which a temperature of the in-vehicle equipment is adjusted to be within a predetermined standard range, and an operational efficiency ($\eta e$) of the in-vehicle equipment is controlled such that a fuel consumption of the in-vehicle equipment approaches a smallest amount when the in-vehicle equipment is operated, the air conditioner comprising:
a first heating portion arranged in a circulation circuit through which a heat medium heated by waste heat of the in-vehicle equipment circulates, the first heating portion heating air to be blown into the vehicle compartment by using the heat medium as a heat source;
a second heating portion configured to heat the blown air by using the heating energy outputted from the in-vehicle equipment;
a determination portion configured to determine a target heat amount ratio that is a target value of a heat amount ratio (hm2/hm1), the heat amount ratio (hm2/hm1) being a ratio of a second heat amount (hm2) used for heating the blown air in the second heating portion to a first heat amount (hm1) used for heating the blown air in the first heating portion; and
a heating adjustment portion configured to adjust at least one of the first heat amount (hm1) and the second heat amount (hm2) such that the heat amount ratio (hm2/hm1) approaches the target heat amount ratio, wherein the determination portion causes the target heat amount ratio to be increased in accordance with an increase of the operational efficiency ($\eta e$); and
the heating adjustment portion increases the second heat amount and decreases the first heat amount in accordance with the increase of the operational efficiency and the target heat amount ratio.

2. The air conditioner according to claim 1, wherein the determination portion increases an elevation degree of the target heat amount ratio in accordance with a decrease of a temperature of the heat medium flowing out of the in-vehicle equipment.

3. The air conditioner according to claim 1, wherein the second heating portion heats the blown air by using electrical energy transformed from mechanical energy outputted from the in-vehicle equipment.

4. The air conditioner according to claim 1, wherein the second heating portion heats the blown air by using mechanical energy outputted from the in-vehicle equipment.

5. The air conditioner according to claim 1, wherein the in-vehicle equipment is an internal combustion engine which outputs mechanical energy by consuming fuel.

6. The air conditioner according to claim 1, wherein the in-vehicle equipment is a fuel cell which outputs electrical energy by consuming fuel.

7. An air conditioner for a vehicle having an in-vehicle equipment which outputs heating energy for heating air to be blown into a vehicle compartment of the vehicle, in which a temperature of the in-vehicle equipment is adjusted to be within a predetermined standard range, and an operational efficiency ($\eta e$) of the in-vehicle equipment is controlled such that a fuel consumption of the in-vehicle equipment approaches a smallest amount when the in-vehicle equipment is operated, the air conditioner comprising:

a first heating portion arranged in a circulation circuit through which a heat medium heated by waste heat of the in-vehicle equipment circulates, the first heating portion heating air to be blown into the vehicle compartment by using the heat medium as a heat source;

a second heating portion configured to heat the blown air by using the heating energy outputted from the in-vehicle equipment;

a determination portion configured to determine a target heat amount ratio that is a target value of a heat amount ratio (hm2/hm1), the heat amount ratio (hm2/hm1) being a ratio of a second heat amount (hm2) used for heating the blown air in the second heating portion to a first heat amount (hm1) used for heating the blown air in the first heating portion; and a heating adjustment portion configured to adjust at least one of the first heat amount (hm1) and the second heat amount (hm2) such that the heat amount ratio (hm2/hm1) approaches the target heat amount ratio, wherein the determination portion causes the target heat amount ratio to be increased in accordance with an increase of the operational efficiency ($\eta e$); and the determination portion determines the target heat amount ratio such that a sum of two products, which are a product of a first fuel cost (f1) and a first heat amount (hm1) and a product of a second fuel cost (f2) and a second heat amount (hm2), approaches the smallest value, when the first fuel cost (f1) is defines as $$f1 = Ful1/hw = (egyl/\eta e)/hw$$

in which, Ful1 is a total fuel consumption of the in-vehicle equipment, egyl is an energy amount of the in-vehicle equipment being capable of outputting, $\eta e$ is the operational efficiency of the in-vehicle equipment, hm1 is the first heat amount used for heating the blown air in the first heating portion, and hw is an amount of the waste heat transferred from the in-vehicle equipment of the heat medium, and the second fuel cost (f2) is defined as $$f2 = Ful2/hm2$$

in which, Ful2 is a fuel consumption of the in-vehicle equipment for outputting the heating energy, and hm2 is the second heat amount used for heating the blown air in the second heating portion.

8. The air conditioner according to claim 7, further comprising a storage portion configured to store the first fuel cost (f1), which correlates to the temperature of the heat medium flowing out of the in-vehicle equipment, and the second fuel cost (f2), wherein the determination portion determines the target heat amount ratio by using the first fuel cost (f1) and the second fuel cost (f2) which are stored in the storage portion.

* * * * *